US010764397B2

(12) United States Patent
Deprun et al.

(10) Patent No.: US 10,764,397 B2
(45) Date of Patent: Sep. 1, 2020

(54) METHOD OF MANAGING THE CONNECTIONS BETWEEN A SECURE ELEMENT AND A SERVER

(71) Applicant: IDEMIA France, Colombes (FR)

(72) Inventors: Jean-François Deprun, Colombes (FR); David Segalou, Colombes (FR); Eric Alzai, Colombes (FR)

(73) Assignee: IDEMIA FRANCE, Colombes (FR)

( * ) Notice: Subject to any disclaimer, the term of this patent is extended or adjusted under 35 U.S.C. 154(b) by 166 days.

(21) Appl. No.: 16/061,846

(22) PCT Filed: Dec. 16, 2016

(86) PCT No.: PCT/FR2016/053535
§ 371 (c)(1),
(2) Date: Aug. 7, 2018

(87) PCT Pub. No.: WO2017/103542
PCT Pub. Date: Jun. 22, 2017

(65) Prior Publication Data
US 2018/0375958 A1    Dec. 27, 2018

(30) Foreign Application Priority Data

Dec. 18, 2015  (FR) ...................... 15 62872

(51) Int. Cl.
| H04L 12/26 | (2006.01) |
| H04L 29/08 | (2006.01) |
| H04W 4/50 | (2018.01) |
| H04L 29/06 | (2006.01) |
| H04W 76/10 | (2018.01) |
| H04W 12/06 | (2009.01) |
| H04W 12/00 | (2009.01) |

(Continued)

(52) U.S. Cl.
CPC .......... H04L 67/325 (2013.01); H04L 43/103 (2013.01); H04L 63/0853 (2013.01);
(Continued)

(58) Field of Classification Search
CPC ..... H04L 67/325; H04L 43/103; H04L 69/28; H04L 63/0853; H04W 12/06;
(Continued)

(56) References Cited

U.S. PATENT DOCUMENTS

| 7,705,721 B1* | 4/2010 | Chen ....................... G06F 11/30 340/518 |
| 2009/0013055 A1* | 1/2009 | Hall, Jr. ................ H04L 67/125 709/208 |

(Continued)

OTHER PUBLICATIONS

International Search Report, PCT/FR2016/053535, dated Apr. 4, 2017.

(Continued)

*Primary Examiner* — Fahmida S Chowdhury
(74) *Attorney, Agent, or Firm* — Nixon & Vanderhye (57) ABSTRACT

Disclosed is a method for managing the connections between a secure element and a server of a communication network, the secure element being incorporated in a host device. The method includes the following steps: —determination of a theoretical time period between two consecutive instants of connection, —determination of a real time period between two consecutive instants of connection between the secure element and the server, —comparison of the determined theoretical time period with the determined real time period, and if the determined theoretical time period is different from the determined real time period: —determination of a new theoretical time period.

26 Claims, 4 Drawing Sheets

(51) Int. Cl.
*H04W 12/08* (2009.01)
*H04W 4/60* (2018.01)
(52) U.S. Cl.
CPC .............. *H04L 69/28* (2013.01); *H04W 4/50* (2018.02); *H04W 12/0027* (2019.01); *H04W 12/06* (2013.01); *H04W 12/08* (2013.01); *H04W 76/10* (2018.02); *H04W 4/60* (2018.02)
(58) Field of Classification Search
CPC . H04W 12/0027; H04W 12/08; H04W 76/10; H04W 4/50; H04W 4/60
See application file for complete search history.

(56) References Cited

U.S. PATENT DOCUMENTS

| | | | | |
|---|---|---|---|---|
| 2009/0172129 | A1* | 7/2009 | Singh | H04L 29/06176 709/217 |
| 2012/0230240 | A1* | 9/2012 | Nebat | H04L 12/1881 370/312 |
| 2015/0059006 | A1* | 2/2015 | White | H04W 12/0609 726/30 |
| 2015/0072736 | A1* | 3/2015 | Berionne | H04W 52/0261 455/558 |
| 2018/0176272 | A1* | 6/2018 | Zur | C07D 471/04 |

OTHER PUBLICATIONS

Giesecke & Devrient: "White Paper The OTA Platform in the World of LTE", Jan. 1, 2011 (Jan. 1, 2011), XP055111231, Retrieved from the Internet: URL:http://www.carabinerpr.com/pdf/WP_OTA_and LTE Jan II.pdf [retrieved on Apr. 1, 2014] the whole document.

Globalplatform: "Remote Application Management over HTTP Card Specification v2.2—Amendment B Version 1.1", Internet Citation. Jun. 2009 (Jun. 2009). pp. 1-25, XP002590002, Retrieved from the Internet: URL:http://www.globalplatform.org/specificationscard.asp [retrieved on Jun. 30, 2010].

* cited by examiner

METHOD OF MANAGING THE CONNECTIONS BETWEEN A SECURE ELEMENT AND A SERVER

BACKGROUND OF THE INVENTION

Field of the Invention

The present invention relates to a method for managing connections between a secure element and a server of a communication network.

It relates in particular to a method for managing so-called "Over-The-Air" connections or OTA connections.

Description of the Related Art

A secure element, such as a chip card for example, is incorporated in a host device. The host device is, for example, a cell phone, a digital tablet or any other electronic equipment items such as an electricity meter, a vehicle, a coffee machine, etc.

A secure element can for example be a card of UICC ("Universal Integrated Circuit Card") type targeted in the ETSI standard TS 102 221, and groups together the conventional chip cards, of SIM (or USIM—for "Universal Subscriber Identity Module") type, but also secure tokens, or for example a card of eUICC (for "embedded Universal Integrated Circuit Card") type and targeted in ETSI standard TS 103 383.

The secure element can also be an element known as "embedded Secure Element" (or eSE).

The server to which the set of secure elements connects forms part of a communication network comprising a set of equipment items of an operator allowing its subscribers connection and connectivity.

When a connection between a secure element and the server is set up, data concerning the secure element or the host device are updated.

For example, data stored or applications installed in the secure element or in the host device are updated with new data, new functionalities or new services offered by the operator.

The connection between a secure element and a server can be implemented at the initiative of the server or of the secure element. When the connection is implemented at the initiative of the server (known as "push mode"), the server sends a message to the host device, for example of SMS type, the secure element then initiating an OTA connection with the server on receipt of the SMS in the connection device. When the connection is implemented at the initiative of the secure element (known as "pull mode"), the secure element initiates the connection with the server through the host device.

The new generations of mobile communication networks, such as, for example, the LTE ("Long Term Evolution") communication networks, (known as "4G networks") do not necessarily use SMSs and consequently cannot implement the connection mode called "push mode". In such communication networks, the connections between the secure elements and the server are set up at the initiative of the secure elements.

Instants of connection and an elapsed time period between two consecutive instants of connection are associated with each secure element.

In order to avoid the saturation of the server, the instants of connection at which the connections, for example OTA connections, which are set up between the secure elements and the server, are spread out over time. For that, the instants of connection and the time period between two consecutive instants of connection associated with the secure elements must be respectively different.

The time period between two consecutive instants of connection can be determined by the secure element and/or by the server and is a function of a polling interval, the polling interval representing the time interval between two consecutive accesses of the host device to the secure element. This determined time period is a theoretical time period.

In particular, the time period between two consecutive instants of connection corresponds to a number of polling intervals.

The polling interval is specific to the host device, but the secure element can invoke the host device to set up the polling interval with a desired value.

Nevertheless, some host devices do not have any functionality allowing them to modify their polling interval or else do not take account of the request from the secure element to modify this value or do not observe the value requested by the secure element and impose their own.

Thus, the time period between two consecutive instants of connection determined by the secure element and/or by the server, or theoretical time period, exhibits a deviation relative to the real time period between two consecutive instants of connection.

BRIEF SUMMARY OF THE INVENTION

The present invention proposes optimizing the management of the connections between the secure elements and the servers of a communication network.

To this end, the present invention proposes, according to a first aspect, a method for managing connections between a secure element and a server of a communication network, the secure element being incorporated in a host device, the method for managing connections comprising the following steps:
  determination of a theoretical time period between two consecutive instants of connection between the secure element and the server as a function of a set of parameters and of a theoretical polling interval associated with said host device,
  determination of a real time period between two consecutive instants of connection between the secure element and the server,
  comparison of said determined theoretical time period with the determined real time period, and
  if the determined theoretical time period is different from the determined real time period:
  modification of at least one parameter of the set of the parameters such that the theoretical time period has a value close to the determined real time period, and
  determination of a new theoretical time period taking into account said at least one of the modified parameters.

Thus, by modifying the value of at least one parameter, the determined theoretical time period can be modified such that it is similar to or tends as close as possible to the real time period between consecutive connections between the secure element and the server.

Consequently, this theoretical time period can be adapted even when the host device does not have the functionality allowing it to modify the polling interval or does not take account of the request originating from the secure element to modify the value of the polling interval.

According to a feature, the method comprises a step of determination of the value of a parameter n by using said set of parameters.

According to a feature, the determination of said theoretical time period comprises a step of multiplication of the theoretical polling interval by said determined value of said parameter n, the result being said theoretical time period.

Thus, the theoretical time period is equal to the theoretical polling interval multiplied by the determined value of the parameter n, the value of the parameter n being determined as a function of the set of parameters.

According to another feature, the step of determination of the real time period comprises a step of counting, implemented by the secure element, of a number of real polling intervals of the host device to the secure element, the real time period being equivalent to the time elapsed during the counting of a number of real polling intervals equal to the determined value of the parameter n.

By virtue of the counting step, the secure element determines, for its part, the real time period and consequently the instants of connection to the server. This counting step implements a counter for counting a number of real polling intervals. When the number of real polling intervals counted or the value of the counter is equal to the value of the parameter n, a real time period has elapsed and the secure element sets up a connection with the server.

Thus, the instants of connection are determined by means of the counting of polling intervals, in numbers equivalent to the value of the parameter n, the elapsed time period between two consecutive instants of connection being represented by the polling interval repeated a certain number of times, the number of times being determined as a function of the set of parameters.

According to a feature, the method comprises a sending step, implemented by the secure element, in which the latest value of the parameter n reached in the step of counting of a number of real polling intervals before the host device is switched off or restarted, is sent to the server, said sending step being implemented when said host device initiates an initialization phase with the server, the initialization phase being implemented after its switching on or restarting of the host device.

Thus, the determination of the theoretical time period takes account of the trend of the value of the parameter n in its preceding connections.

According to different embodiments, the server can take account of the value of the parameter received on the switching on of the host device or disregard it.

According to a feature, the set of parameters comprises a unique identification parameter, a first parameter and a second parameter.

The use of the first and second parameters in the determination of the time period between two consecutive instants of connection makes it possible to obtain different values of the parameter n, and consequently theoretical time periods for one and the same secure element.

The values of the first and second parameters are registered in the secure element when it is manufactured and are then modified during the use of the secure element.

According to a feature, after the switching on or restarting phase and the initialization phase, the method comprises the setting up of a first connection at a first time instant said first instant of connection has a value lying between a first predetermined time instant and a second predetermined instant.

Thus, the first and second parameters are determined such that the value of the parameter n has a value such that the first instant of connection lies between a minimum time instant and a maximum time instant.

Furthermore, the server knows the interval within which the secure element must connect.

Consequently, the security in the connections between the secure element and the server is enhanced. This is particularly advantageous for the first connection to the server set up by the secure element.

According to a feature, the method comprises a step of determination, implemented by the server, of the real polling interval associated with the host device based on the real time period and on the determined value of the parameter n.

Thus, once the secure element has set up two consecutive connections to the server, the server knows the real time period and the value of the parameter n, and can thus determine the real polling interval.

According to one embodiment, the modification step is implemented by the server and the method further comprises a sending step, implemented by the server, in which said at least one modified parameter is sent to said secure element, said step of determination of a new theoretical time period being implemented by said secure element by using said at least one modified parameter received.

In this embodiment, the server modifies at least one parameter of the set of parameters and sends it to the secure element. The value of the parameter n is determined as a function of the set of parameters by the secure element.

According to another embodiment, the step of modification and the step of determination of a new theoretical time period are implemented by said server, and the method further comprises a sending step, implemented by the server, in which said determined new theoretical time period is sent to the secure element.

Thus, according to this embodiment, the theoretical time period is determined by the server as a function of the modified set of parameters. The determined theoretical time period is then sent to the secure element, the secure element taking into account this determined new period for the next connection to the server.

According to a feature, the method for managing connections comprises the creation of a data structure comprising data relating to a set of secure elements, said data relating to said set of secure elements being, for each secure element of the set, said determined theoretical time period, said determined real time period, the determined theoretical polling interval, the determined real polling interval and the number of polling intervals counted during the counting step.

Thus, the determined real and theoretical time periods, the theoretical and real polling intervals determined for each secure element and the number of polling intervals counted for each secure element are stored in the data structure. This data structure then collects the latest determined time periods (real and theoretical) and the latest determined polling intervals (real and theoretical) for each secure element of the set, as well as the number of polling intervals counted before the host device is switched off or restarted.

The data structure also comprises the identifier number or unique identification parameter of the secure element, the profile of the host device ("terminal profile"), the value of the polling interval counter and a first predetermined time instant and a second predetermined time instant.

According to a feature, the data structure is stored in the server, and is updated when one of the data is determined or received.

Thus, the server and the secure element use updated values of the connection periods and polling interval.

The invention relates, according to a second aspect, to a server of a communication network comprising means for connecting with a set of secure elements, each secure element being incorporated in a host device, the server comprising, for each secure element:
- means for determining a theoretical time period between two consecutive instants of connection between the secure element and the server as a function of a set of parameters and of a theoretical polling interval associated with the host device,
- means for determining a real time period between two consecutive instants of connection between the secure element and the server,
- means for comparing the determined theoretical time period with the determined real time period,
- means for modifying at least one parameter of the set of parameters such that the theoretical time period has a value close to the determined real time period if the determined theoretical time period is different from the determined real time period, and
- means for determining a new theoretical time period taking into account at least one of the modified parameters.

According to a feature, the server further comprises means for determining the value of a parameter n by using the set of parameters.

According to a feature, the server comprises means for determining the theoretical time period comprising means for multiplying the theoretical polling interval by the determined value of the parameter n, the result of the implementation of the multiplication means being the theoretical time period.

According to a feature, the server comprises means for receiving the latest value of the parameter n reached by the means for counting a number of real polling intervals in the secure element, before the host device is switched off or restarted, the latest value of said parameter n being sent by the secure element when the host device initiates an initialization phase with the server, the initialization phase being implemented after the switching on or the restarting of said host device.

According to another feature, the server comprises means for determining the first parameter and the second parameter such that the first instant of connection has a value lying between a first predetermined time instant and a second predetermined instant.

According to another feature, the server comprises means for determining the real polling interval associated with the host device on the basis of the real time period and the determined value of the parameter n.

According to a feature, the server comprises sending means configured to send to the secure element at least one parameter of the modified set of parameters.

According to another feature, the sending means are further configured to send to said secure element said determined new theoretical time period.

According to a feature, the server comprises means for creating a data structure comprising data relating to a set of secure elements, the data relating to the set of secure elements being, for each secure element of the set, the determined theoretical time period, the determined real time period, the theoretical polling interval, the determined real polling interval and the number of polling intervals counted during the counting step.

According to another feature, the server comprises means for storing said data structure and means for updating said data structure when at least one of the data in the data structure is determined.

Moreover, the server further comprises means for determining, for each secure element, instants of connection to the server as a function of a unique identification parameter associated with the secure element.

According to a feature, the server comprises modification means configured to modify the value of said first parameter and of said second parameter at predefined instants.

Thus, the determined instants of connection can be modified for one and the same secure element. For example, as indicated above, the instants of connection can thus be modified after each connection between the secure element and the server, and can be deduced with difficulty by third-party devices.

The security in the connections between the secure elements of the set and the server is, consequently, more enhanced.

The modification of the first and second parameters by the server is particularly advantageous in the case of a host device which would not observe a request, for and from a secure element, to use a polling interval value transmitted by a request for modification of the polling interval, well known to the person skilled in the art by the proactive command "Poll Interval". In this case, the server modifies the first and second parameters such that the determined instants of connection are matched to the characteristics of the host device and to the expectations of the server.

The invention relates, according to a third aspect, to a secure element comprising means for managing connections with a server of a communication network, characterized in that it further comprises:
- means for determining the value of a parameter n by using a set of parameters, said set of parameters comprising a unique identification parameter associated with said secure element, a first parameter and a second parameter,
- means for determining the real time period between two consecutive instants of connection to the server, and
- means for setting up a connection with the server at instants of connection.

For example, the secure element can be a secure element of UICC type, a secure element of embedded UICC (eUICC) type or an embedded secure element (eSE).

According to a feature, the means for determining the real time period comprises means for counting a number of real polling intervals of the host device to the secure element, the real time period being equivalent to the time elapsed during the counting of a number of real polling intervals equal to the value of the parameter n determined by the determination means.

The invention relates, according to a fourth aspect, to a host device comprising a secure element according to the invention.

In an embodiment, the host device is a mobile communication terminal.

The secure element, the server and the host device have features and advantages similar to those described previously in relation to the method for managing connections.

In a particular embodiment, the different steps of the abovementioned method are determined by computer program instructions.

Consequently, the invention also relates to a computer program on an information medium, this program being capable of being implemented by a microprocessor, this program comprising instructions suited to implementing the steps of the method as mentioned above.

This program can use any programming language, and be in the form of source code, object code, or intermediate code between source code and object code, such as in a partially compiled form, or any other desirable form.

The invention also targets a microprocessor-readable information medium, comprising instructions of a computer program as mentioned above.

The information medium can be any entity or device capable of storing the program. For example, the medium can comprise a storage means, such as a ROM, for example a microcircuit ROM, or even a magnetic storage means, for example a hard disk, or even a flash memory.

Also, the information medium can be a transmissible medium such as an electrical or optical signal, which can be routed via an electrical or optical cable, wirelessly or by other means. The program according to the invention can in particular be downloaded on a storage platform of a network of Internet type.

Alternatively, the information medium can be an integrated circuit in which the program is incorporated, the circuit being adapted to execute or to be used in the execution of the method concerned.

The abovementioned information medium and computer program have features and advantages similar to the method that they implement.

BRIEF DESCRIPTION OF THE DRAWINGS

Other particular features and advantages of the invention will become more apparent from the following description.

In the attached drawings, given by way of nonlimiting examples.

DETAILED DESCRIPTION OF THE PREFERRED EMBODIMENTS

Figure 1:
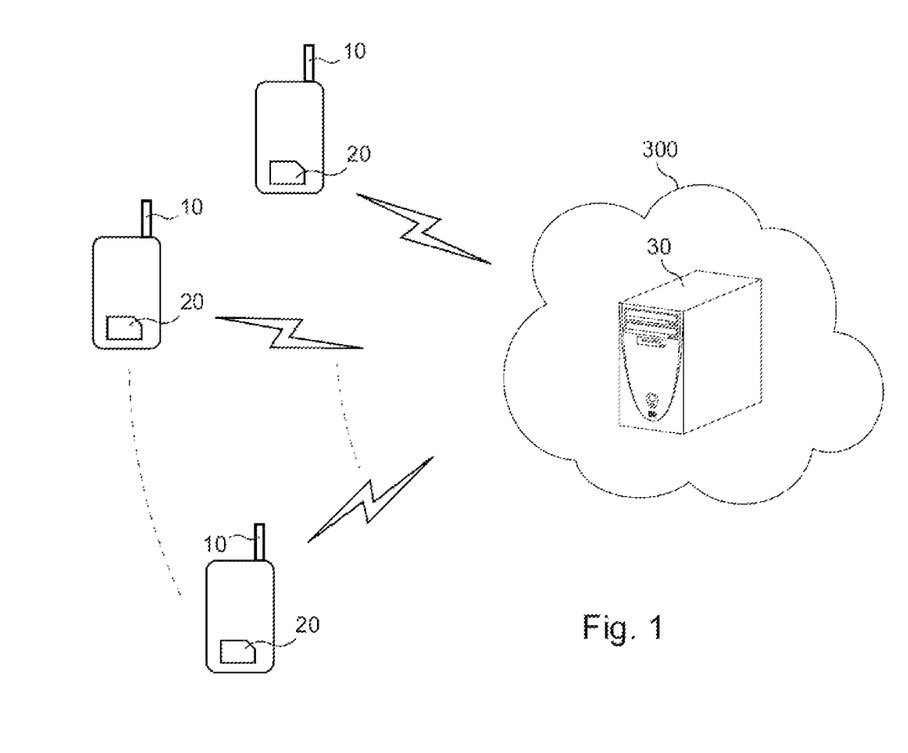
FIG. 1 schematically represents a context in which an embodiment of the present invention is implemented.

FIG. 1 represents a set of host devices 10, each of the host devices comprising a secure element 20.

Obviously, each host device 10 can comprise a different number of secure elements 20.

The host devices 10 are for example cellphones, digital tablets or any other electronic equipment item such as an electricity meter, a vehicle, a coffee machine, etc.

This set of host devices can comprise different types of secure elements, that is to say can comprise, for example, a subset of cellphones, a subset of tablets, and other subsets of another electronic equipment item.

The secure element 20 is for example a universal integrated circuit card (UICC) or an embedded universal integrated circuit card (eUICC) or even a secure element of eSE type.

The secure elements 20 of the set can communicate with a communication network 300 comprising a set of equipment items of an operator allowing its subscribers connection and connectivity.

In particular, the set of equipments items of the operator comprises a server 30 with which the secure elements 20 of the set communicate and from which data concerning the secure elements 20 or the host devices 10 are updated.

Figure 2:
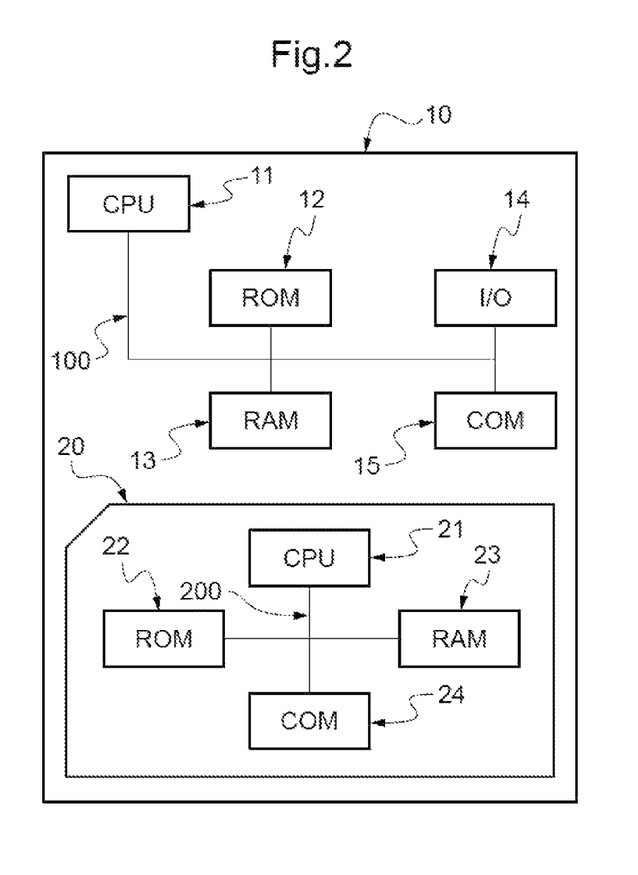
FIG. 2 schematically represents a host device comprising a secure element according to an embodiment of the invention.

FIG. 2 schematically represents a host device 10 comprising a secure element 20 according to an embodiment of the invention.

The host device 10 comprises a communication bus 100 to which are linked:
- a processing unit 11, called CPU (Central Processing Unit) in the figure and being able to comprise one or more processors;
- a nonvolatile memory 12, for example ROM (Read Only Memory), EEPROM (Electrically Erasable Read Only Memory) or a flash memory;
- a random access memory 13 or RAM;
- an input/output interface 14, called I/O (Input/Output) in the figure, for example a screen, a keyboard, a mouse or another pointing device such as a touchscreen or a remote control allowing a user to interact with the system via a graphical interface; and
- a communication interface 15, called COM in the figure, suitable for exchanging data, for example, with a server via a network, or a read/write interface.

The secure element 20 comprises a communication bus 200 to which are linked:
- a processing unit 21 or microprocessor, called CPU (Central Processing Unit) in the figure;
- a nonvolatile memory 22, for example ROM (Read Only Memory), EEPROM (Electrically Erasable Read Only Memory) or flash memory;
- a random access memory 23 or RAM; and
- a communication interface 24, called COM in the figure, suitable for exchanging data with the processor 11 of the host device 10.

The random access memory 23 comprises registers adapted for storing variables and parameters created and modified during the execution of a computer program comprising instructions for the implementation of a method according to the invention. The instruction codes of the program stored in nonvolatile memory 22 are loaded into RAM memory 23 in order to be executed by the processing unit CPU 21.

The nonvolatile memory 22 is, for example, a rewritable memory of EEPROM or flash memory type that can constitute a medium within the meaning of the invention, that is to say that can comprise a computer program comprising instructions for the implementation of the methods according to the invention.

Figure 3:
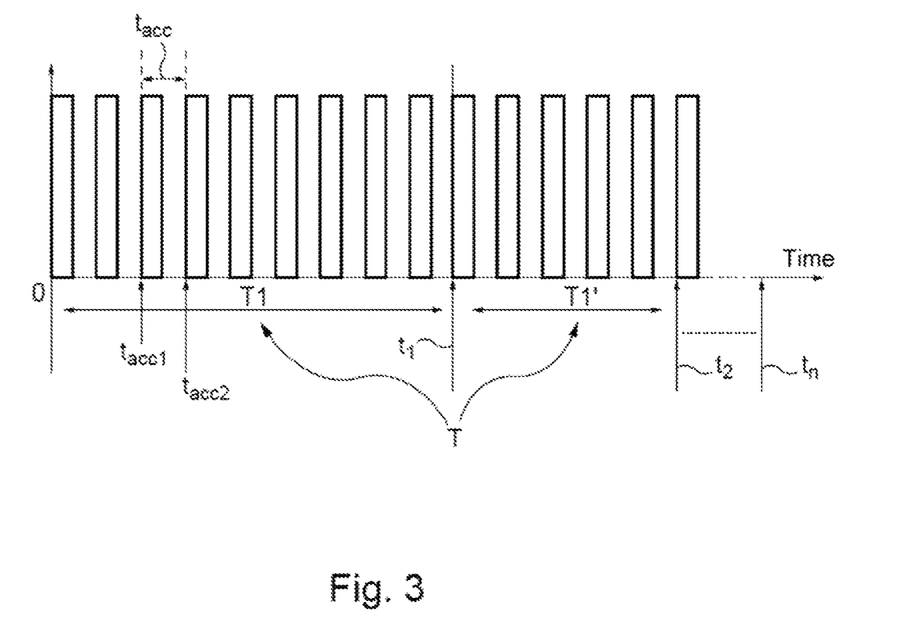
FIG. 3 represents a diagram in which connections in time are represented.

FIG. 3 represents a time line in which instants of connection of a secure element 20 to a server 30 are represented.

This figure illustrates instants of connection $t_1, t_2, \ldots t_n$, in particular a first instant of connection $t_1$ and a second instant of connection $t_2$, the instants of connection $t_1$, $t_2$ corresponding to two consecutive connections set up between a secure element 20 of the set and the server 30.

The time elapsed between the two consecutive connections or two consecutive instants of connection $t_1$, $t_2$ correspond to a real time period which will be called connection period T in the document.

When the host device 10 is switched on and its switch-on and initialization phase is implemented, the host device 10 periodically polls the secure element 20. For example, upon a polling, the host device 10 sends a command ("STATUS" command) to the secure element 20. Thus, the secure element 20 periodically receives the "STATUS" command from the host device 10.

The time elapsed between the sending of two consecutive "STATUS" commands by the host device 10 corresponds to what is called the "polling interval" $t_{acc}$.

The polling interval $t_{acc}$ is associated with the host device 10, and its value varies from one host device to another. Thus, a host device 10 can be characterized in relation to this value.

Generally, the polling interval $t_{acc}$ has a value of 30 seconds, that is to say that 30 seconds elapse between two pollings from the host device 10 to the secure element 20, or between the sending of two STATUS commands from the host device 10 to the secure element 20.

The polling interval $t_{acc}$ can be registered in the secure element 20 for example when it is manufactured.

As represented in FIG. 3, a determined number of polling intervals $t_{acc}$ is present between the moment when the host device 10 will begin to send its STATUS commands (after its switching on and initialization phase, instant represented by 0 in FIG. 3) and the first instant of connection $t_1$. The time elapsed between the instant 0 and the first instant of connection $t_1$ represents a time period called $T_1$. It will be noted that a determined number of polling intervals $t_{acc}$ is present between the instant 0 and the first instant of connection $t_1$, in this example the number being nine polling intervals.

Furthermore, a determined number of polling intervals $t_{acc}$ are present between the first instant of connection $t_1$ and the second instant of connection $t_2$, the time elapsed between the first instant of connection $t_1$ and the second instant of connection $t_2$ represents a time period called $T_1'$. Thus, the time period $T_1'$ comprises a determined number of polling intervals $t_{acc}$. In the example represented, the real time period elapsed between two consecutive instants of connection $t_1$ and $t_2$ or connection period $T_1'$ comprises five polling intervals $t_{acc}$.

Thus, a polling interval $t_{acc}$ represents the time elapsed between two consecutive pollings from the host device 10 to the secure element 20.

In the exemplary embodiment represented in FIG. 3, the time instants $t_{acc1}$, $t_{acc2}$ respectively represent a first polling and a second polling from the host device 10 to the secure element 20.

In some host devices 10, the associated polling interval $t_{acc}$ value can be modified at the request of the secure element 20 that it incorporates.

For the polling interval $t_{acc}$ to be able to be modified, the host device 10 must support a functionality allowing the modification of the value of the polling interval $t_{acc}$.

When a secure element 20 wants to modify and propose a modification of the value of the polling interval $t_{acc}$, it sends a command, for example a proactive command of the "Poll Interval" type, to the host device 10.

It will be noted that a proactive command corresponds to a command addressed by a secure element to a host device incorporating the secure element.

If the host device 10 supports a functionality allowing modification of the value of the polling interval $t_{acc}$, it responds to the secure element by sending it a command called "Terminal Response Command" in which the maximum value of the polling interval supported by the host device 10 is included.

It will be noted that the value of the polling interval $t_{acc}$ is only modified if the host device supports a functionality allowing this modification.

In some cases, when the host device does not modify the value of the polling interval, it informs the secure element thereof and the latter can, in turn, inform the server thereof.

As described above, it will be noted that the real time period between two consecutive instants of connection or connection period is different for each secure element 20 of the set. This time period or connection period being determined among other things as a function of a unique identification parameter ICCID associated with the secure element 20.

As illustrated in FIG. 3, the connection period T or time period between two consecutive instants of connection $t_1$, $t_2$ represents a time equivalent to the polling interval $t_{acc}$ repeated a certain number of times.

Thus, the time period between two consecutive instants of connection $t_1$, $t_2$ is a function of the value of the polling interval associated with the host device 10.

Consequently, the time period between two consecutive instants of connection $t_1$, $t_2$ or connection period T is determined in an embodiment by the formula:

$$T = n \times t_{acc}$$

in which $t_{acc}$ corresponds to the polling interval associated with the host device 10 incorporating the secure element 20, and n corresponds to the parameter representing the number of times that the polling interval $t_{acc}$ is repeated within a time period between two instants of connection $t_1$, $t_2$ or connection period T.

The number of times that the polling interval $t_{acc}$ is t repeated in a connection period T corresponds to the value of a parameter n. The parameter n is determined as a function of the unique identification parameter ICCID associated with the secure element 20, as well as two parameters, a first parameter V and a second parameter I.

Thus, in one embodiment, the value of the parameter n is determined by a function F having as input the unique identification parameter ICCID, the first parameter V and the second parameter I.

Thus, n=F(ICCID, V, I)

The ICCID, V and I parameter values are registered in the secure element 20 when it is manufactured. The first parameter V and the second parameter I, subsequently, evolve and are updated during the use of the secure element, once activated and deployed in the "field".

In particular, the value of the first parameter V is incremented after each connection of the secure element 20 to the server 30. The value of the second parameter I can be modified by the server 30. When the value of the second parameter I is modified by the server 30, the deduction by third-party devices of the instants of connection is made more difficult, the connections between the secure element and the server being more secure.

These parameters can be used for the determination of the connection period T by the secure element 20 without requiring any action on the part of the server 30.

In one embodiment, the function F (ICCID, V, I) takes the following form:

$$F(ICCID,V,I) = \text{constant } 1 + (\text{hash}(ICCID,V,I)) \times \text{MODULO constant } 2$$

where constant 1, constant 2 represent durations, the result of the function F thus being a time.

As a nonlimiting example, constant 1 has a value of a week and constant 2 has a value of a day. The secure element then sets up a connection with the server at instants of connection spaced apart by a duration corresponding to a week plus a random duration between 0 and 1 day.

Obviously, the values of constant 1 and constant 2 can be different from the preceding example.

Once the parameter n has been determined, the polling interval $t_{acc}$ is multiplied by the determined value, the result of this multiplication being the time period between two consecutive instants of connection $t_1$, $t_2$ or connection period T.

Once the connection period T is determined, instants of connection (such as the first instant of connection $t_1$ and the second instant of connection $t_2$ represented in FIG. 3) are determined as a function of the determined connection period T.

The secure element 20 sets up a connection with the server 30 at each determined instant of connection.

Thus, the time period between two consecutive instants of connection $t_1$, $t_2$ is a function of a set of parameters and of the polling interval $t_{acc}$ associated with the host device 10, the set of parameters comprising the unique identification parameter ICCID, the first parameter V and the second parameter I.

It will be noted that the secure element 20 and the server 30 determine the instants of connection and the time period between two theoretical instants of connection $t_1$, $t_2$ by using a theoretical polling interval value $t_{acc}$.

Nevertheless, as indicated above, the real value of the polling interval of the host device 10 to the secure element 20 does not correspond to that requested by the secure element 20, this requested value being that used in the computation of the theoretical time period between two consecutive instants of connection $t_1$, $t_2$.

Thus, there is a real polling interval and a theoretical polling interval, and consequently, a theoretical time period and a real time period between two consecutive instants of connection.

According to one embodiment, in the secure element 20, a trip counter is configured to count the number of polling intervals $t_{acc}$ present in the connection period T or time period between two consecutive instants of connection $t_1$, $t_2$, and thus determine an instant of connection to the server 30.

When a number of polling intervals $t_{acc}$ equal to the value of the determined parameter n is counted, the secure element 20 sets up a connection with the server 30 at the determined time instant.

As indicated above, upon a polling from the host device 10 to the secure element 20, for example at the instant $t_{acc1}$, a "STATUS" command is sent by the host device 10 to the secure element 20.

Thus, in the embodiment described, the trip counter counts the number of "STATUS" commands sent by the host device 10 to the secure element 20, which corresponds to counting the number of real polling intervals $t_{acc}$.

As will be described later, according to an embodiment, the trip counter is incremented on each STATUS command received.

According to another embodiment, the trip counter is initialized at the value of the parameter n which has been determined, the trip counter being decremented on each STATUS command received.

Figure 4:
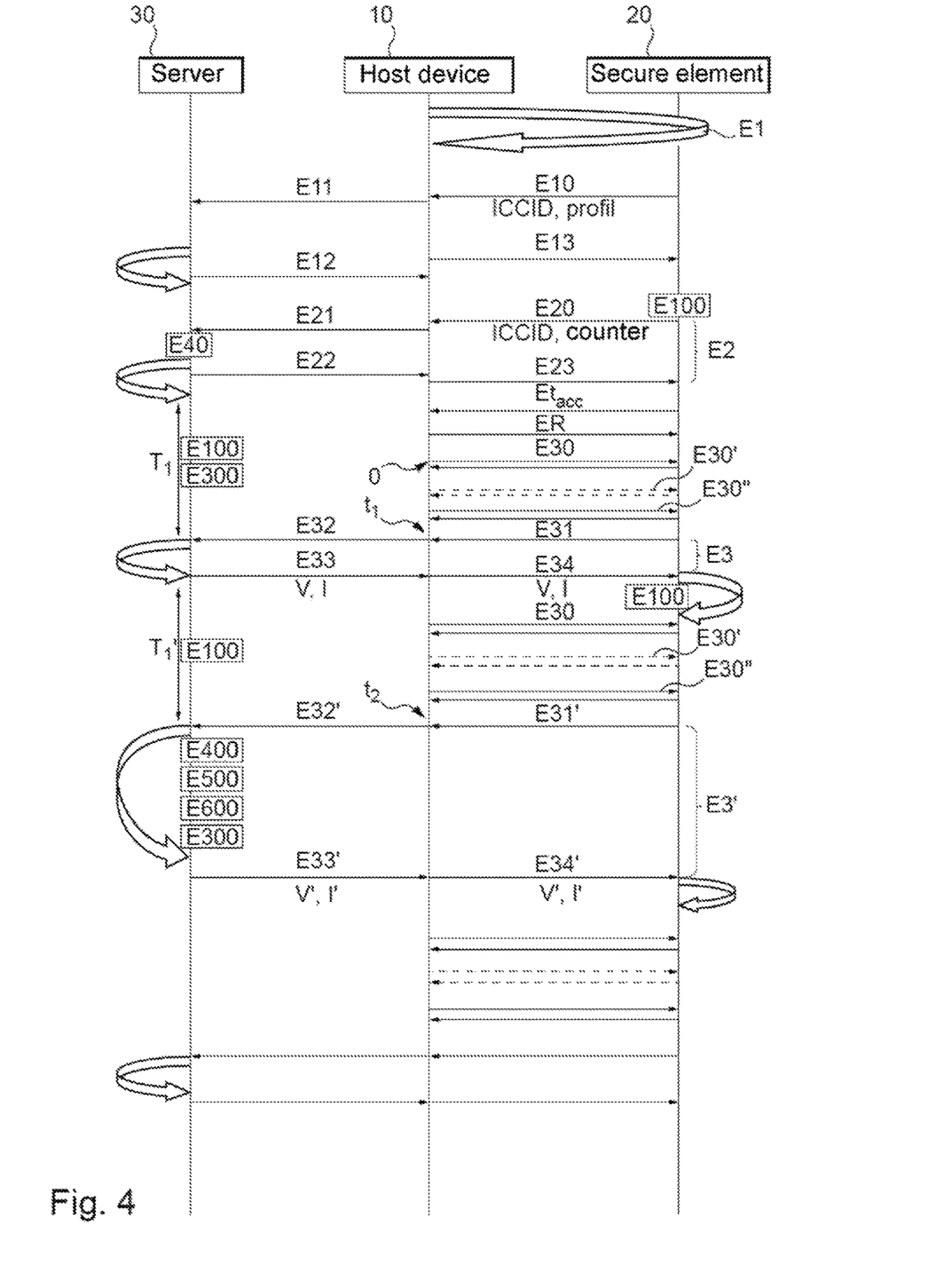
FIG. 4 schematically represents steps of a method for managing connection between a secure element and a server according to an embodiment of the invention.

Steps of the method for managing connections between a secure element 20 and a server 30 of a communication network 300 according to an embodiment is represented in FIG. 4.

When the host device 10 incorporating the secure element 20 is switched on, an initialization procedure E1 is implemented.

During this initialization procedure, the secure element 20 sends (after a possible delay, to the server 30), via the host device 10, a message indicating to it that it is operational and has just been activated, this message comprising parameters. Thus, the secure element 20 sends a command E10 containing these parameters to the host device 10.

It will be noted that the secure element can wait for a delay after being switched on (or "powered on") before connecting to the server 30. This delay is determined by using the function F(ICCID, V, I), the latter making it possible to obtain the value of the parameter n, and by using the value of the polling interval.

For the determination of the first instant of connection t1 of the secure element 20 to the server 30, the values of the first parameter V and of the second parameter I are such that the value of this first instant of connection t1 lies between a first predetermined time instant and a second predetermined time instant.

The values of the first and second parameters (V, I) are registered in the secure element when it is manufactured and are used for the determination of any first instant of connection of the secure element to the server when the secure element is first commissioned. Similarly, first predetermined time instant and second predetermined time instant are registered in the secure element when it is manufactured.

Thus, according to one embodiment, the method for managing connections comprises the setting up of a first connection, at a first instant of connection, having a value lying between a first predetermined time instant and a second predetermined time instant. This determination step is implemented after the switching on or restarting phase and the initialization step.

The parameters sent by the secure element via the command E10, during the initialization procedure, comprise, for example, the unique identification parameter ICCID associated with the secure element 20 and the profile of the host device 10, a profile which was first transmitted to the secure element by the host device after the switching on of the host device and during the initialization sequence. Profile should be understood to mean the characteristics supported by the host device 10 (usually referred to by the term "terminal profile").

The host device 10 sends a message E11 to the server 30 thus transferring the information received from the secure element 20 through the command E10. The server 30 acknowledges receipt to the host device 10 with a message E12, and the host device 10 sends the acknowledgement of receipt via a command E13 to the secure element 20.

The initialization procedure in particular makes it possible to register the profile or "terminal profile" of the host device 10 with the server 30. It will be noted that the ICCID is referenced beforehand in the servers for aspects of authentication in the network. Thus, by virtue of the sending of the ICCID of the secure element 20 at the same time as the profile, a correspondence between the profile of the host device 10 and the secure element 20 that it contains is thus established.

Thus, once the initialization procedure is finished, the secure element 20 and the host device 10 are registered in the server 30.

Next, the secure element 20 implements a step of sending E2 of the unique identification parameter ICCID. During this sending step E2, a command E20 is sent by the secure element 20 to the host device 10. The host device 10 then transfers the information of the command E20 to the server 30 via the message E21. The server 30 then returns an acknowledgement of receipt E22 to the host device 10, which, in its turn, sends the acknowledgement of receipt via a command E23 to the secure element 20.

In addition to the unique identification parameter ICCID, in the sending step E2, the secure element 20 sends to the server (by means of the host device 10) the latest value of the parameter n reached in the step of counting of a number of real polling intervals, before said host device 10 is switched off or restarted.

As described above, the method comprises a step of determination of the real time between two consecutive instants of connection $t_1$, $t_2$ between the secure element 20 and the server 30.

On the server side 30, this determination step is implemented once the server 30 has received two consecutive connections for the secure element 20.

On the secure element side 20, the step of determination of this real time period comprises a step of counting of a number of real polling intervals $t_{acc}$ from the host device 10 to the secure element 20, the real time period being equivalent to the time elapsed during the counting of a number of real polling intervals $t_{acc}$ equal to the value of the determined parameter n.

The determination of the value of the parameter n is implemented by using the set of parameters, the set of parameters comprising a unique identification parameter ICCID, a first parameter V and a second parameter I.

It will be noted that the sending of the commands E20, E21, E22 and E23 is optional, this sending being implemented only according to certain embodiments.

In one embodiment, the method comprises the creation E40 of a data structure comprising data relating to a set of secure elements 20, the data relating to the set of secure elements 20 being, for each secure element 20 of the set, the determined theoretical time period, the determined real time period, the determined theoretical polling interval, the determined real polling interval and the number of polling intervals counted in the counting step.

According to one embodiment, the data structure is stored in the server 30, and is updated when at least one of the data is determined.

The data structure further comprises the unique identification parameter of the secure element 20, the profile of the host device 10 ("terminal profile"), the first predetermined time instant and the second predetermined instant (the secure element setting up the first connection to the server at an instant lying between these two predetermined time instants) and the value of the trip counter. An association between a secure element referenced by its unique identifier ICCID and the characteristics of the parameters of the host device in which it is located or else the characteristics of the secure element itself can thus be made. Similarly, an association between a given host device and the characteristics of the parameters of this type of host device can also be made.

The data structure also comprises the value of the determined parameter n. This value of the parameter n is updated on each step of determination E100 of the value of the parameter.

Furthermore, when the secure element is first put into operation, the value of the parameter n determined after the initialization phase E1 is stored in the data structure. This first value of the parameter n can be used subsequently by the server in a mode of operation.

In the embodiment represented, the secure element 20 asks the host device 10 to modify the polling interval $t_{acc}$. The secure element 20 thus sends a command $Et_{acc}$, (proactive command of "Poll Interval" type) to the host device 10 and the host device 10 responds to it with the sending of a command ER ("Terminal Response" command).

These steps of requesting modification of the "polling interval" are known to the person skilled in the art and are not described here in detail.

It will be noted that, in some host devices 10, the polling interval $t_{acc}$ can be modified at the request of the secure element 20. Nevertheless, in other host devices 10, the polling interval cannot be modified and/or the request for modification from the secure element is not taken into account by the host device.

Once the host device 10 is switched on, it periodically sends to the secure element 20 "STATUS" commands E30, E30' and 30".

In this embodiment, once the trip counter reaches, in the counting step, a determined number of "STATUS" command sent from the host device 10 to the secure element 20, the secure element 20 initiates a connection with the server 30 via the host device 10.

According to one embodiment, the trip counter can be incremented and, when it reaches the value of the parameter n, the secure element 20 initiates a connection, for example an OTA ("Over The Air") connection, via the host device 10 with the server 30.

According to another embodiment, the trip counter can be initialized at the value of the parameter n, and it will subsequently be decremented each time a "STATUS" command is received. Once the trip counter has the value zero (the value of the parameter n having thus been counted), the secure element 20 initiates a connection with the server 30 via the host device 10. This connection is for example an OTA ("Over The Air") connection.

To do this, the secure element 20 sends a connection command E31 to the host device 10 which then sends a connection message E32 to the server 30.

The server 30, on its side, comprises means for determining a parameter n whose value is a function of said unique identification parameter ICCID, of a first parameter V and of a second parameter I.

The server 30 also comprises means for determining consecutive theoretical instants of connection of the secure element 20 with the server 30. Such theoretical instants of connection are determined by the multiplication of a theoretical polling interval associated with a host device 10 incorporating said secure element 20 and represent the theoretical time elapsed between two consecutive pollings from said host device 10 to said secure element 20, by said determined value of the parameter n.

Also, by way of a nonlimiting example, the value of the theoretical polling interval can be 30 seconds.

Thus, the server 30 implements a step of determination E300 of a theoretical time period between two consecutive instants of connection $t_1$, $t_2$ between the secure element 20 and the server 30 as a function of a set of parameters and of a theoretical polling interval associated with the host device 10.

This step of determination E300 of said theoretical time period comprises a step of multiplication of said theoretical polling interval by said determined value of said parameter n, the result being said theoretical time period T. In some embodiments, the value of the counter received by the server is taken into account in the determination of the instants of connection $t_1$, $t_2$, ..., $t_n$.

In other embodiments, the server 30 implements a step of determination E100 of the value of the parameter n by using the set of parameters ICCID, V, I.

In one embodiment, the values of the first parameter V and of the second parameter I are modified at predefined instants.

For example, the values of the parameters V, I are modified by the server on each connection between the secure element 20 and the server 30. The instants at which connections between the secure element 20 and the server 30 are implemented thus correspond to predefined instants.

Thus, once the connection between the secure element 20 and the server 30 is set up, the server 30 can send new parameters V, I to the host device 10 via a message E33. The host device 10 then transfers, in its turn and via the command E34 intended for the secure element 20, the modified parameters V, I.

Once the command E34 is received by the secure element 20, the secure element 20 determines the value of the parameter n, as a function of the unique identification parameter ICCID, and of the modified first parameter V and second parameter I. Next, the secure element 20 determines a new connection period implementing a step of counting of the value of the determined parameter n.

The secure element 20 then resets the value of the trip counter to the determined value of the parameter n, and once again counts the number of "STATUS" commands E30, E30', E30" received from the host device 10. Once a number of "STATUS" commands E30, E30', E30" that is equivalent to the value of the parameter n has been counted, the secure element 20 initiates a new connection with the server 30.

Thus, the secure element 20 sends a new connection command E31' to the host device 10, and the host device 10 transfers the connection command via a message E32' to the server 30. The server 30 can then send to the host device 10 a message E33' comprising an update of the first parameter V and of the second parameter I. The host device 10 then transfers to the secure element 20 the updated parameters V, I via a command E34'.

The secure element 20 then determines the value of the parameter n with the unique identification parameter ICCID and the updated first parameter V and second parameter I, in order to determine the new connection period T1'.

It will be noted that the connection periods T1, T1' can be different or equal given that the first parameter V and the second parameter I have been updated by the server 30. Obviously, if at least one of the parameters V, I is modified, when updated by the server, by a value different from the preceding one, the connection period T1' will be different from the connection period T1. On the contrary, if neither of the parameters V, I is modified when updated by the server, or if they are but with values identical to the preceding values, the connection period T1' will be equal to the connection period T1.

As for the polling interval $t_{acc}$, it has not been modified between two consecutive connections.

As indicated above, the periodical updating of the first and second parameters V, I strengthens the security in the connections between the secure element 20 and the server 30, the connection periods T1, T1' associated with the secure elements 20 being difficult to predict by a third-party device.

Once the server 30 has received two connections at consecutive instants of connection $t_1$, $t_2$ from the secure element 20, it is able to implement the step of determination E400 of the real time period between two consecutive instants of connection between the secure element 20 and the server 30.

The method then comprises a step of determination, implemented by said server 30, of said real polling interval associated with said host device 10.

In one embodiment, the real polling interval is determined on the basis of said real time period and of said determined value of said parameter n.

Next, the server 30 implements a step of comparison E500 of the determined theoretical time period with the determined real time period.

If the determined theoretical time period is different from the determined real time period, the server implements a step of modification E600 of at least one parameter of the set of parameters such that the theoretical time period has a value close to the determined real time period. Once the parameters are modified, a step of determination E300 of a new theoretical time period taking into account said at least one of the modified parameters is implemented.

According to the embodiment represented, the modification step E600 is implemented by the server 30. The method then further comprises a sending step E33', implemented by the server, in which said at least one parameter V, I of the modified set of parameters V, I, ICCID is sent to the secure element 20, the step of determination E100 of the value of a parameter n being implemented by the secure element by using said at least one modified parameter V, I received. The secure element 20 then determines a new theoretical time period by using the value of the determined parameter n.

According to another embodiment (not represented), the step of modification and the step of determination of a new theoretical time period are implemented by said server 30. The method then further comprises a sending step, implemented by the server 30, in which the new determined theoretical time period is sent to the secure element 20.

The invention claimed is:

1. A method for managing connections between a secure element and a server of a communication network, said secure element being incorporated in a host device, said method comprising:
    determining a theoretical time period between two consecutive instants of connection between said secure element and said server as a function of a set of parameters and of a theoretical polling interval associated with said host device;
    determining a real time period between two consecutive instants of connection between said secure element and said server;
    comparing said determined theoretical time period with the determined real time period; and
    when the determined theoretical time period is different from the determined real time period:
        modifying at least one parameter of said set of parameters, the theoretical time period determined based on the modified at least one parameter having a value close to the determined real time period, and
        determining a new determined theoretical time period taking into account said at least one of the modified parameters.

2. The method as claimed in claim 1, further comprising determining a number n by using said set of parameters, the number n representing a number of times that the theoretical polling interval is repeated within a time period between two instants of connection.

3. The method as claimed in claim 2, wherein the determining said theoretical time period comprises multiplying said theoretic polling interval by said determined value of said number n, a result being said theoretical time period.

4. The method as claimed in claim 2, wherein said determining said real time period comprises counting, implemented by said secure element, a number of real polling intervals of the host device to the secure element, the real time period being equivalent to the time elapsed during the counting the number of real polling intervals equal to the value of the determined number n.

5. The method as claimed in claim 4, further comprising sending to the server, implemented by the secure element, the latest value of said number n reached in the counting the number of real polling intervals before said host device is switched off or restarted, said sending being implemented when said host device initiates an initialization phase with the server, said initialization phase being implemented after a switching on or the restarting of said host device.

6. The method for managing connections as claimed in claim 1, wherein said set of parameters includes a unique identification parameter associated with the secure element.

7. The method for managing connections as claimed in claim 6, wherein, after a switching on or restarting phase and an initialization phase, said method further comprises setting up a first connection at a first instant of connection having a value lying between a first predetermined time instant and a second predetermined time instant.

8. The method for managing connections as claimed in claim 4, further comprising determining, implemented by said server, said real polling interval associated with said host device based on said real time period and on said determined value of said number n.

9. The method as claimed in claim 1, wherein said modifying is implemented by the server, and said method further comprises:
sending, by the server, said at least one modified parameter to said secure element; and
determining a new theoretical time period implemented by said secure element by using said at least one received modified parameter.

10. The method as claimed in claim 2, wherein said modifying and said determining the value of number n are implemented by said server, and said method further comprises sending, by the server, said determined value of the number n to said secure element.

11. The method for managing connections as claimed in claim 4, further comprising creating a data structure comprising data relating to a set of secure elements, said data relating to said set of secure elements being, for each secure element of the set, said determined theoretical time period, said determined real time period, the determined theoretical access internal, the determined real polling interval, and the number of polling intervals counted during the counting.

12. The method for managing connections as claimed in claim 11, wherein said data structure is stored in said server, and the data structure is updated when at least one of the data is determined or received.

13. A server of a communication network configured to connect with a set of secure elements, each secure element being incorporated in a host device, said server comprising:

at least one processor configured to
determine a theoretical time period between two consecutive instants of connection between said secure element and said server as a function of a set of parameters and of a theoretical polling interval associated with said host device,
determine a real time period between two consecutive instants of connection between said secure element and said server,
compare said determined theoretical time period with the determined real time period,
modify at least one parameter of said set of parameters, the theoretical time period determined based on the modified at least one parameter having a value close to the determined real time period when the determined theoretical time period is different from the determined real time period, and
determine a new theoretical time period taking into account said at least one modified parameter.

14. The server as claimed in claim 13, wherein the at least one processor is further configured to determine a value of a number n by using said set of parameters comprising a unique identification parameter associated with the secure element, said number n representing a number of times that the theoretic polling interval is repeated within a time period between two instants of connection.

15. The server as claimed in claim 14, wherein said at least one processor configured to determine said theoretical time period by multiplying said theoretical polling interval by said determined value of said number n, a result of the multiplying being said theoretical time period.

16. The server as claimed in claim 15, wherein the at least one processor is further configured to receive the latest value of said number n reached by counting a number of real polling intervals in said secure element, before said host device is switched off or restarted, said latest value of said number n being sent by said secure element when said host device initiates an initialization phase with the server, said initialization phase being implemented after the switching on or the restarting of said host device.

17. The server as claimed in claim 14, wherein the at least one processor is further configured to, after a switching on or a restarting phase and an initialization phase, set up a first connection at a first instant of connection having a value lying between a first predetermined time instant and a second predetermined instant.

18. The server as claimed in claim 16, wherein the at least one processor is further configured to determine said real polling interval associated with said host device based on said real time period and on said value determined value of said number n.

19. The server as claimed in claim 13, wherein the at least one processor is configured to send to said secure element said at least one modified parameter.

20. The server as claimed in claim 19, wherein the at least one processor is further configured to send to said secure element said determined new theoretical time period.

21. The server as claimed in claim 16, wherein the at least one processor is configured to create a data structure comprising data relating to a set of secure elements, said data relating to said set of secure elements being, for each secure element of the set, said determined theoretical time period, said determined real time period, the theoretical polling interval, the determined real polling interval, and the number of polling intervals.

22. A secure element configured to manage connections with a server of a communication network, the secure element comprising:

at least one processor configured to
determine a value of a number n by using a set of parameters comprising a unique identification parameter associated with said secure element, said number n representing a number of times that a theoretical polling interval is repeated within a time period between two instants of connection,
determine the real time period between two consecutive instants of connection to the server, and
set up a connection with the server at connection instants.

23. The secure element as claimed in claim 22, wherein the at least one processor is configured to determine said real time period by counting a number of real polling intervals of a host device to the secure element, the real time period being equivalent to a time elapsed during the counting of the number of real polling intervals equal to the value of the determined number n.

24. The secure element as claimed in claim 22, wherein the secure element is a UICC-type secure element or an embedded UICC-type secure element or an embedded secure element.

25. A host device, comprising:
a secure element configured to manage connections with a server of a communication network, the secure element comprising
at least one processor configured to
determine a value of a number n by using a set of parameters comprising a unique identification parameter associated with said secure element, said number n representing a number of times that a theoretical polling interval is repeated within a time period between two instants of connection,
determine the real time period between two consecutive instants of connection to the server, and
set up a connection with the server at connection instants.

26. A non-transitory computer-readable medium comprising computer-executable instructions which, when executed by a computer, cause the computer perform the method as claimed in claim 1.

* * * * *